Figure 1:
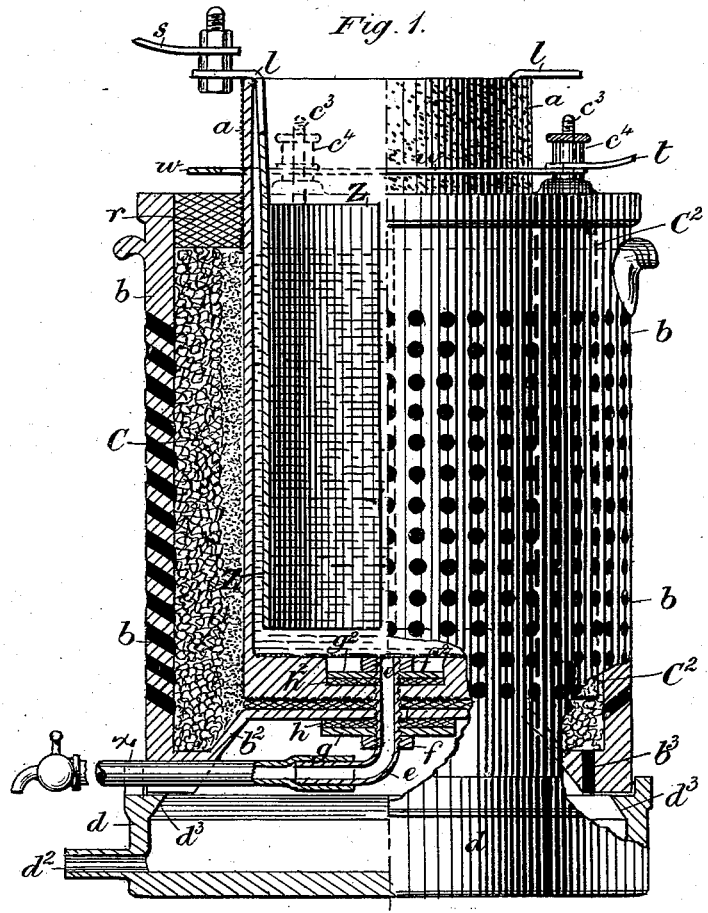

(No Model.)

W. WALKER, Jr., F. R. WILKINS & J. LONES.
PRIMARY BATTERY.

No. 524,229. Patented Aug. 7, 1894.

Witnesses:—
George Shaw
Richard Skerrett

Inventors:—
William Walker, Junr
Frank Richard Wilkins
Jabez Lones

UNITED STATES PATENT OFFICE.

WILLIAM WALKER, JR., OF BIRMINGHAM, FRANK. RICHARD WILKINS, OF HANDSWORTH, AND JABEZ LONES, OF SMETHWICK, ENGLAND.

PRIMARY BATTERY.

SPECIFICATION forming part of Letters Patent No. 524,229, dated August 7, 1894.

Application filed February 27, 1894. Serial No. 501,713. (No model.) Patented in Belgium February 7, 1894, No. 108,431, and in Austria-Hungary April 27, 1894, No. 1,246.

*To all whom it may concern:*

Be it known that we, WILLIAM WALKER, Jr., of Birmingham, FRANK. RICHARD WILKINS, of Handsworth, and JABEZ LONES, of Smethwick, England, subjects of the Queen of Great Britain, have invented certain new and useful Improvements in Primary Voltaic Batteries, (patented in Belgium, No. 108,431, February 7, 1894, and in Austria-Hungary, No. 1,246, April 27, 1894;) and we do hereby declare that the following is a full, clear, and exact description of the invention, which will enable others skilled in the art to which it appertains to make and use the same.

Our invention has reference to single liquid primary voltaic batteries and has for its object to prevent wholly or in great part the condition in the said batteries called by electricians polarization, a condition by which the electro-motive-force of the said batteries is much reduced. The said polarization is produced by the evolution of hydrogen at the negative element of the battery and in double liquid batteries such for example as Grove's battery and Daniel's battery is suppressed in the former by nitric acid and in the latter by a solution of sulphate of copper, the nascent hydrogen combining in the former case with the oxygen of the nitric acid and in the latter case replacing the copper of the sulphate of copper.

In constructing a single liquid battery according to our invention we employ amalgamated zinc as the positive element and carbon as the negative element the electrolyte or exciting liquid being preferably a strong solution of caustic soda or caustic potash. We do not however limit ourselves to the use of any particular electrolyte.

We arrange the parts of the battery preferably in the following manner: The amalgamated zinc preferably either in the form of a hollow or a solid cylinder, is placed in a porous cylindrical cell. The porous cell is situated concentrically in a perforated glazed earthenware jar of about double the diameter of the porous cell. We fill the annular space between the perforated earthernware jar and the porous cell with carbon, that portion of the carbon in contact with the porous cell being in fine powder while that portion of the carbon in contact with the perforated earthenware jar is in the form of coarse powder or grains. The oxygen of the atmospheric air contained in the pores of the carbon combines with the nascent hydrogen and prevents polarization. The carbon is preferably gas retort carbon or carbon of the kind used for making the rods of electric arc lamps.

Figure 2:
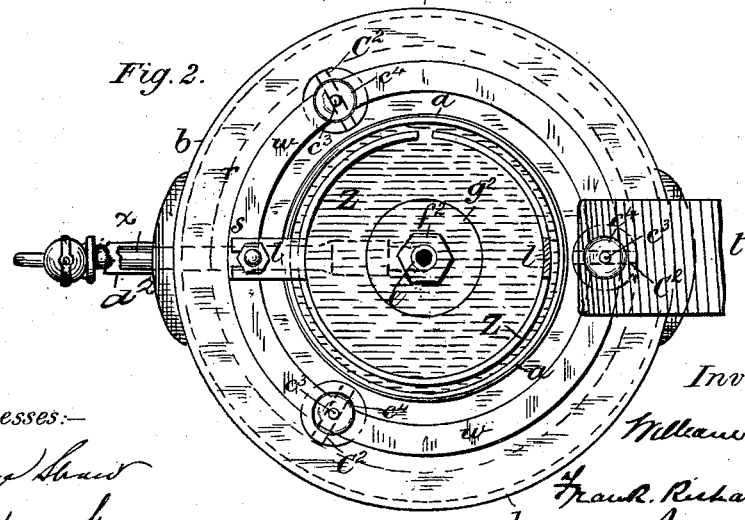

Figure 1 of the accompanying drawings represents partly in elevation and partly in vertical section a primary voltaic battery constructed according to our invention and Fig. 2 represents the same in plan.

The same letters of reference indicate the same parts in both figures of the drawings.

$a$ is the porous cell containing the electrolyte, preferably a strong solution of caustic soda or caustic potash. The said porous cell $a$ is situated concentrically in and supported on the raised bottom of the perforated glazed earthenware jar or vessel $b$. The said perforated earthenware jar $b$ stands on the internal flange or shoulder $d^3$ of the earthenware tray $d$. The porous cell $a$ and the raised bottom of the jar $b$ have holes coinciding with one another. Situated in the said holes is the screwed end of the elbow shaped metal pipe $e$ the said pipe being fixed in position by the india rubber washers $h$, $h^2$, metal washers $g$, $g^2$ and screw nuts $f$, $f^2$. The fixing of the pipe $e$ in position also secures the porous cell $a$ to the raised bottom of the perforated jar $b$.

The space between the perforated jar $b$ and porous cell $a$ is filled or nearly filled with powdered carbon C which forms the negative element of the battery. We prefer to make the powdered carbon in contact with the porous cell $a$ finer than that in contact with the perforated jar $b$. One, two or more, we have represented three, solid carbon plates or rods $C^2$ are inserted in the carbon the said plates or rods $C^2$ extending from the top to the bottom of the jar $b$. The tops of the said plates or rods $C^2$ are preferably capped with lead and are provided with screws $c^3$ and screw nuts $c^4$ by means of which and the metal ring $w$ the said carbon plates or rods $C^2$ are put into electrical communication with each other.

The open mouth of the jar $b$ is closed or sealed with asphaltum or other cement $r$.

The amalgamated zinc cylinder Z constituting the positive element of the battery is suspended in the electrolyte by means of zinc strips $l$ made in one piece with the zinc cylinder Z the turned out ends of which strips $l$ rest on the top of the porous cell $a$.

The conducting wire or metal band $s$ constituting one of the terminals of the battery is connected to the zinc cylinder and the other metal band or conductor $t$ constituting the other terminal of the battery is connected to the metal ring $w$ as represented.

The bottom of the porous cell $a$ and that portion of the top of the said cell $a$ standing above the perforated jar $b$ are glazed. The glazing of the top of the porous cell $a$ prevents wholly or in great part the creeping of the electrolyte in the said cell over the glazed upper part.

When the porous cell $a$ is filled with the electrolyte the said liquid oozes very slowly through the unglazed or porous portion of the side of the porous cell $a$ and percolates through the carbon C collecting in the annular trough $b^2$ formed by the raising of the middle portion of the bottom of the jar $b$. The bottom of the trough $b^2$ is provided with a series of vertical holes $b^3$ through which the liquid as it slowly collects in the trough, passes into the tray $d$. The tray $d$ is provided with a pipe $d^2$ through which the liquid received by the tray may run off to a vessel placed for its reception.

When the exciting power of the electrolyte is nearly exhausted the porous cell $a$ may be emptied by the pipe $x$ connected to the elbow $e$ the said pipe $x$ being provided with a stop cock not shown in the drawings. By almost closing the stopcock referred to the partially exhausted electrolyte may be allowed to slowly pass from the porous cell, fresh electrolyte being supplied at a similar rate to the said porous cell at its open top.

By the action of the battery nascent hydrogen occurs on the surface of the carbon constituting the negative element of the battery and meeting with the condensed atmospheric air in the pores of the carbon combines with the oxygen of the same, the supply of air to the powdered carbon passing through the holes in the perforations in the jar $b$. The hydrogen thus never assumes a gaseous form and polarization is wholly or in great part prevented.

Having now described our invention, what we claim as new, and desire to secure by Letters Patent, is—

A single liquid primary voltaic battery consisting essentially of a perforated glazed earthenware jar or vessel and a porous cell of much smaller diameter than and situated concentrically in the perforated earthenware jar for containing the electrolyte in which the zinc or positive element is suspended, the space between the perforated jar and porous cell being filled with powdered carbon in which one, two or more plates or rods of solid carbon are inserted the heads or tops of which are in electrical contact with each other, the said primary voltaic battery being constructed and arranged substantially as hereinbefore described and illustrated in the accompanying drawings.

WILLIAM WALKER, JUNR. [L. S.]
FRANK. RICHARD WILKINS. [L. S.]
JABEZ LONES. [L. S.]

Witnesses:
GEORGE SHAW,
RICHARD SKERRETT.